United States Patent [19]

Gates et al.

[11] 4,301,646
[45] Nov. 24, 1981

[54] DEFOLIATOR

[76] Inventors: Donald C. Gates, 610 N. University Dr., Fargo, N. Dak. 58102; Wayne S. Tonsfeldt, Sabin, Minn. 56580

[21] Appl. No.: 175,301

[22] Filed: Aug. 4, 1980

[51] Int. Cl.³ .......................................... A01D 23/02
[52] U.S. Cl. ............................................... 56/121.43
[58] Field of Search .......... 56/504, 505, 121.4–121.46; 171/21, 22

[56] References Cited

U.S. PATENT DOCUMENTS

| 3,583,136 | 6/1971 | Eisenhardt et al. | 56/121.43 |
| 3,717,982 | 2/1973 | Meiners | 56/63 |
| 3,914,923 | 10/1975 | Arends | 56/63 |

FOREIGN PATENT DOCUMENTS 203349 of 1968 U.S.S.R. .............................. 56/121.4

Primary Examiner—Robert A. Hafer
Attorney, Agent, or Firm—Henderson & Sturm

[57] ABSTRACT

An apparatus for removing foliage from row crops including a frame adapted to be connected to a prime mover for movement in a forward direction. A plurality of rotors are rotatably attached to the frame and are disposed transversely to the forward direction of movement thereof. A mechanism is provided for selectively rotating the rotor. A first brush is attached to each rotor at a first place on the rotor, a second brush is attached to each rotor at a second place on the rotor, the second brush being spaced from the first brush. An adjusting structure is provided for selectively adjusting the relative positions of the first and second brushes on each rotor with respect to each other for adjusting for the width of rows of crops.

8 Claims, 7 Drawing Figures

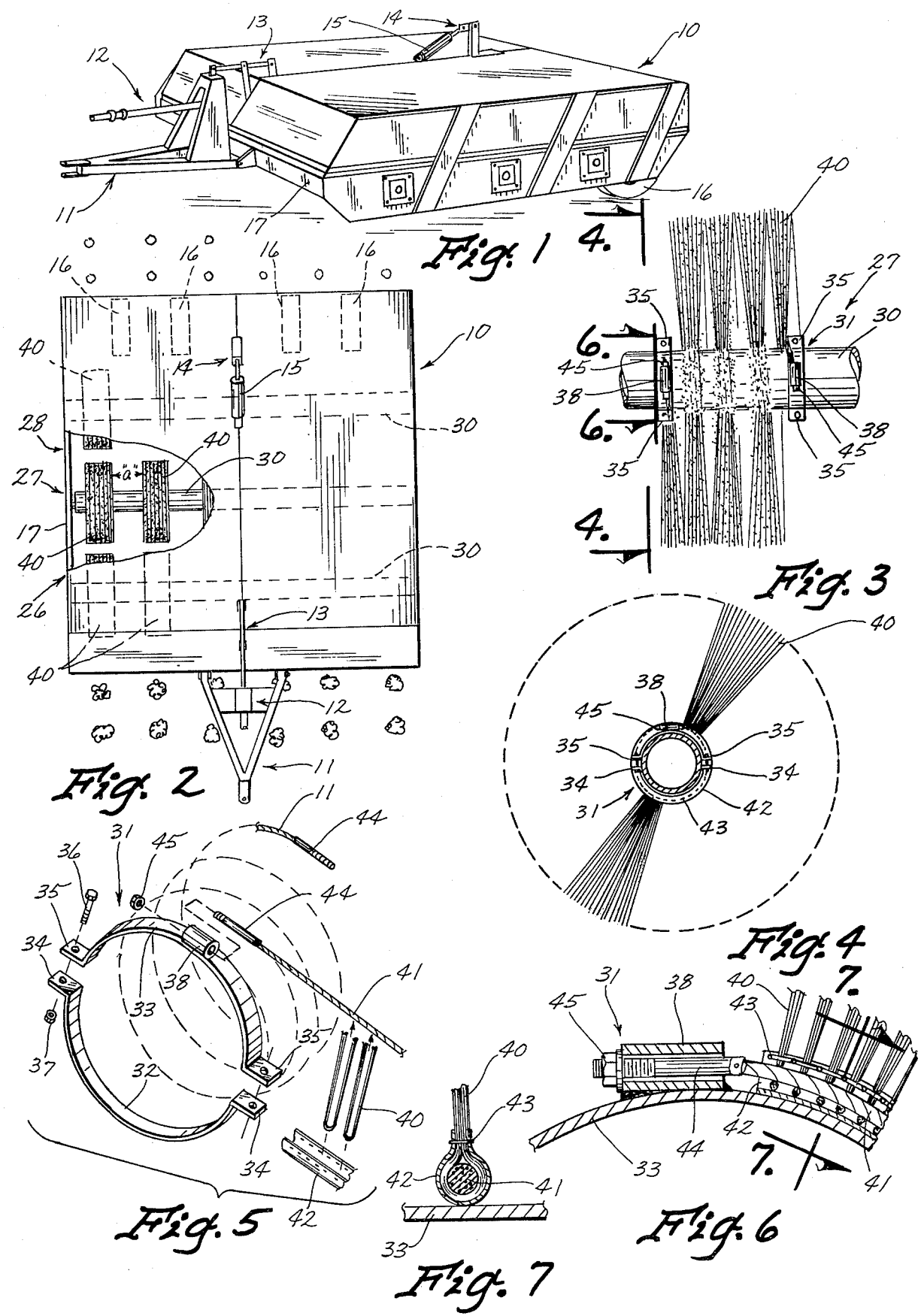

DEFOLIATOR

BACKGROUND OF THE INVENTION

The present invention relates generally to machines operable to remove foliage, such as beet tops, leaves, weeds, potato vines, or the like from the root crops prior to harvesting the crops. These machines generally have a frame and power-driven rotors carrying foliage removing members such as metal or large rubber flails. Located rearwardly of such rotors, is typically at least one scalper unit mounted on a beam. Ground-engaging wheels support the beam and adjustable connectors attach the beam to the frame or by the frame and the rotors are vertically adjustable. One unit typical of the prior art is shown in U.S. Pat. No. 3,583,136 to Eisenhardt, et al.

One of the major problems with prior art structures is that the flails are very costly both as an initial cost for the machine and also when replacement is necessary which replacement is frequently required in this type of a machine.

Consequently, there is a need for more economical flail units for use in defoliator machines of a type described above.

SUMMARY OF THE INVENTION

The present invention relates to an apparatus for removing foliage from row crops. A frame is provided which is adapted to be connected to a prime mover for movement in a forward direction. At least one rotor is rotatably attached to the frame and is disposed transversely to the forward direction of movement. A mechanism is provided for selectively rotating the rotors. A first brush is attached to each rotor at a first place on each rotor. A second brush is attached to each rotor at a second place on each rotor, the second brush being spaced from the first brush. An adjusting structure is provided for selectively adjusting the relative positions of the first and second brushes on each rotor with respect to each other for adjusting for the width of rows of crops.

An object of the present invention is to provide an improved foliage removing apparatus.

Another object of the invention is to provide a new and novel flail structure for use on foliage removing machines.

Still another object of the invention is to provide a more economical structure to replace flails on foliage removing machines.

Still another object of the invention is to provide a brush type flail structure which is readily adjustable along the rotor for adjusting for the particular width of rows being defoliated at any particular time.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a perspective view of a defoliator constructed with the present invention;

FIG. 2 shows a top plan view of the preferred embodiment of FIG. 1 and having a portion of the cover thereof cut away to show the rotor and flail arrangement therebelow;

FIG. 3 shows a side elevational enlarged view of a portion of one of the rotors having the new and novel brush flail structure of the present invention attached thereto;

FIG. 4 is a cross-sectional view taken along line 4—4 of FIG. 3, the dashed lines being shown to indicate that the brush bristles extend all the way around the rotor;

FIG. 5 is a partial enlarged exploded perspective view of the brush construction and adjusting mechanism;

FIG. 6 is an enlarged partial cross-sectional view taken along line 6—6 of FIG. 3; and FIG. 7 is a cross-sectional view taken along line 7—7 of FIG. 6.

DESCRIPTION OF THE PREFERRED EMBODIMENT

Referring now to the drawings, wherein like reference numerals designate identical or corresponding parts throughout the several views, FIG. 1 shows a preferred embodiment 10 of the foliage removing apparatus of the present invention. The foliage removing apparatus 10 includes a tongue assembly 11, a drive assembly 12, a leveling assembly 13 and a level adjusting assembly 14 including a hydraulic cylinder 15, as is shown in more detail in U.S. Patent Application, Ser. No. 052,756 to Donald C. Gates, which application is incorporated herein by reference. The height adjusting assembly 14 is used to control the vertical position of the wheel 16 with respect to the frame 17 of the foliage removing apparatus 10 to thereby control the level of the machine with respect to the ground.

The present embodiment 10 can be constructed substantially identically to the above recited Gates application, Ser. No. 052,756, except for the improvement of the present invention which relates to the rotor and flail structure shown in FIGS. 2-6.

Referring to FIG. 2, it is noted that three identical rotors 26, 27 and 28 are rotatably attached to the frame 17. These rotors 26, 27 and 28 would be disposed in the apparatus 10 and correspond to rotors 76, 77 and 78 respectively in the above recited Gates application, and these rotors 26, 27 and 28 would be rotated in a similar fashion and in the same direction as disclosed in the Gates application, i.e., the rotor 26 would rotate in a direction such that the bristles at the bottom of brush 26 are moving rearwardly, the bristles at the bottom of the brush 27 are moving rearwardly and the bristles at the bottom of the rotor 28 are moving forwardly. It is to be understood, however, that this is only a preferred rotational arrangement and that other rotational arrangements taught in the prior art could also be used within the scope of this invention.

Referring now to FIG. 3, it is noted that the portion of the rotor 27 which is shown has a tubular portion 30 which is rotatably attached to the frame 17. An adjusting assembly 31 is shown in FIG. 5 and includes a pair of semi-circular clamp members 32 and 33 which are bolted together at end flanges 34 and 35 by bolts 36 and nuts 37. The nut and bolt assemblies 36 and 37 are tightened enough such that the members 33 and 32 are frictionally rigidly secured to the rotor 27, for example, as shown in FIG. 4. A tubular member 38 is rigidly secured, such as by welding, to the member 33 and has an opening 39 disposed therethrough.

Brush or bristle elements 40 are disposed around and attached to a cable 41 in the manner shown in FIGS. 5-7, wherein the bristles 40 are wrapped around at the middle thereof of the cable 41 and have a cloth canvas 42 wrapped around the portion thereof which is wrapped around the cable 41. Then the bristles and canvas member 42 are sewn together at the top portion of the canvas by threads 43 as can best be seen in FIGS. 6 and 7. The ends of the cable 41 have a threaded rod member 44 rigidly secured thereto, such as by welding or with set screws or the like.

To secure the brush structure 42 to the tube 30, one of the clamping structures 31, including members 32 and 33 is placed in a pre-determined location, and bolted securely to prevent frictional rotation with respect to the tube 30. Then one end 44 of the cable 41, with the bristles attached thereto, is placed through the opening 39 in the tubular member 38 and a nut member 45 is threaded onto the threaded rod 44, for example, as shown in FIG. 6. Then the cable 41 with the brush elements 40 attached thereto is wrapped, in a helical fashion around, the tube 30 until it gets to a place where a second member 32 and second member 33 have been bolted to and frictionally engage tube 30. The other end of the cable 41, having a second threaded rod 44 attached thereto, is secured through a second tubular member 38 in an identical fashion as is shown in FIG. 6 such that the cable 41 is tight and the brushes stick radially outwardly, as best shown in FIGS. 3 and 4.

Typically the length of the bristles from where they engage the tube 30 to their outwardmost extremity, is about three times the diameter of the tube 30. The primary difference between this structure and that which has been shown in the prior art is the thin construction of the bristles as opposed to the thick and heavy flails shown in the prior art. Of course, thicker or thinner brush type bristles can be used but the general distinction of this invention is that bristles are used and are defined as members having a length, from where they contact the tube 30 to their radially outwardmost end, of at least one-hundred times the thickness or diameter of each respective bristle. The actual construction material of the bristles is not critical and they may, for example, be made of nylon or polypropylene, to give but two examples of durable bristles which could be used.

In operation, the foliage removing apparatus 10 would be pulled through the field such that the tops of the crops, such as sugar beets, would be removed due to the rotation of the brushes 40 hitting the tops of the plants. It is noted that the spacing between adjacent brush elements is indicated as "a" in FIG. 2. If the crops have been planted at a different distance than is set on the machine, then this distance "a" can be changed by merely loosening the nut and bolt assemblies 36 and 37 and one of the nuts 45 on threaded rod member 44, and the entire assembly can be slid along the tube 30 to an appropriate position. Then the nut and bolt assemblies 36 and 37 and the nut and shaft assemblies 44 can be tightened down to provide an adjusting mechanism for adjusting to the particular width of rows in any particular field.

Obviously, many modifications and variations of the present invention are possible in light of the above teachings. It is therefore to be understood that, within the scope of the appended claims, the invention may be practised otherwise than as specifically described.

We claim:

1. Apparatus for removing foliage from row crops comprising:
    a frame adapted to be connected to a prime mover for movement in a forward direction;
    a rotor rotatably attached to said frame disposed transversely to said forward direction;
    means for selectively rotating said rotor;
    a first brush means attached to said rotor at a first place on said rotor;
    a second brush means attached to said rotor at a second place on said rotor, said second brush means comprising a plurality of bristles connected to a flexible line, said flexible line being disposed in a coil around said rotor, said second brush means being spaced from said first brush means; and
    adjusting means for selectively adjusting the relative position of the second brush means with respect to the first brush means on said rotor for adjusting for the width of rows of crops, said adjusting means comprising a first clamp means rigidly attached to said rotor, connecting means for connecting one end of said flexible line to said clamp means, a second clamp means rigidly connected to said rotor and a second connecting means for connecting the other end of said flexible line to said clamp means.

2. Apparatus as defined in claim 1 including a third brush means attached to said rotor at a third place on said rotor, said third brush means being spaced from said first and second brush means; and, further adjusting means attached to said third brush means and to said rotor for selectively adjusting the position of the third brush means along said rotor with regard to said first and second brush means.

3. Apparatus as defined in claim 1 wherein said first brush means comprises a plurality of bristles extending radially outwardly from said rotor.

4. Apparatus as defined in claim 3 wherein said bristles have a length of at least one hundred times the diameter thereof.

5. Apparatus as defined in claim 3 wherein said bristles have a length of at least one hundred times the width thereof.

6. Apparatus as defined in claim 2 wherein said first, second and third brush means comprise a plurality of bristles having a length of at least one hundred times the diameter thereof extending radially outwardly from said rotor.

7. Apparatus as defined in claim 1 wherein said second connecting means includes a threaded rod connected to the other end of said flexible line; a member having an opening disposed therein rigidly connected to said clamp means, said threaded rod being disposed through said opening, and threaded nut means threadably disposed on said threaded rod for adjustably tightening the line means around said rotor.

8. Apparatus as defined in claim 7 wherein said first and second clamp means includes means for selectively tightening said first and second clamp means against the rotor for preventing relative rotation of the first and second clamp means with regard to the rotor or loosening said first and second clamp means whereby said clamp means can be moved to desired positions on said rotor and then tightened to stay in such desired positions.

* * * * *